United States Patent
Hems et al.

(10) Patent No.: US 9,137,496 B2
(45) Date of Patent: Sep. 15, 2015

(54) ENTERTAINMENT SYSTEM AND METHOD OF COMMUNICATION

(75) Inventors: Mark Robert Hems, London (GB); Anthony John Pyle, London (GB); Steven Wright, London (GB); Michael Adam Kavallierou, London (GB)

(73) Assignee: Sony Computer Entertainment Europe Limited (GB)

( * ) Notice: Subject to any disclaimer, the term of this patent is extended or adjusted under 35 U.S.C. 154(b) by 24 days.

(21) Appl. No.: 13/089,424

(22) Filed: Apr. 19, 2011

(65) Prior Publication Data
US 2011/0302609 A1    Dec. 8, 2011

(30) Foreign Application Priority Data
Apr. 21, 2010 (EP) .................................... 10160531

(51) Int. Cl.
| | | |
|---|---|---|
| *G06F 3/00* | (2006.01) | |
| *G06F 13/00* | (2006.01) | |
| *H04N 5/445* | (2011.01) | |
| *H04N 7/173* | (2011.01) | |
| *H04N 7/16* | (2011.01) | |

(Continued)

(52) U.S. Cl.
CPC ....... *H04N 7/17318* (2013.01); *H04N 5/44543* (2013.01); *H04N 7/16* (2013.01); *H04N 21/435* (2013.01); *H04N 21/4788* (2013.01); *H04N 21/482* (2013.01); *H04N 21/4882* (2013.01); *H04N 21/8352* (2013.01); *H04N 21/84* (2013.01)

(58) Field of Classification Search
CPC .......................... H04N 7/17318; H04N 21/435
USPC ................. 725/37–61, 68, 100, 131, 139, 151
See application file for complete search history.

(56) References Cited

U.S. PATENT DOCUMENTS

| | | | |
|---|---|---|---|
| 2003/0026344 A1 | 2/2003 | Rindsberg et al. | |
| 2003/0225833 A1* | 12/2003 | Pilat et al. ..................... | 709/204 |
| 2007/0186241 A1 | 8/2007 | Sugimoto et al. | |
| 2007/0245399 A1* | 10/2007 | Espelien ....................... | 725/133 |
| 2009/0133070 A1* | 5/2009 | Hamano et al. ................ | 725/46 |

(Continued)

FOREIGN PATENT DOCUMENTS

WO    9920026 A1    4/1999

OTHER PUBLICATIONS

European Search Report, EP 10160531, dated Aug. 1, 2011.

*Primary Examiner* — Pankaj Kumar
*Assistant Examiner* — Alazar Tilahun
(74) *Attorney, Agent, or Firm* — Lerner, David, Littenberg, Krumholz & Mentlik, LLP (57) ABSTRACT

An entertainment system comprises a receiver operable to receive broadcast programmes and electronic programme guide data, a display generator operable to generate an image for display, a user interface generator operable to use received electronic programme guide data to generate an electronic programme guide indicating one or more programmes on a broadcast schedule, for display as some or all of the image, a user input operable to receive an input indicating a programme selected by a user from the electronic programme guide, and a network communicator operable to communicate with one or more remote entertainment systems over a network. The entertainment system is arranged to obtain information based upon the electronic programme guide data corresponding to the user's selected programme, and the communicator is arranged to transmit a message comprising the obtained information to one or more remote entertainment systems, thereby indicating to each remote system the user's selected programme.

12 Claims, 6 Drawing Sheets

(51) Int. Cl.
*H04N 21/435* (2011.01)
*H04N 21/4788* (2011.01)
*H04N 21/482* (2011.01)
*H04N 21/488* (2011.01)
*H04N 21/8352* (2011.01)
*H04N 21/84* (2011.01)

(56) References Cited

U.S. PATENT DOCUMENTS

2009/0260038 A1 10/2009 Acton et al.
2010/0058417 A1* 3/2010 Rondeau et al. .............. 725/110
2010/0071000 A1 3/2010 Amento et al.

* cited by examiner

ENTERTAINMENT SYSTEM AND METHOD OF COMMUNICATION

CROSS REFERENCE TO RELATED APPLICATIONS

The present application claims the benefit of and priority to EP Application No. 10160531.9, filed Apr. 21, 2010, the entire disclosure of which is incorporated by reference herein.

BACKGROUND OF THE INVENTION

1. Field of the Invention

The present invention relates to an entertainment system and method of communication.

2. Description of the Prior Art

Entertainment systems for receiving television programmes, often known as 'set-top boxes', typically comprise a receiver able to receive analogue or (more recently) digital television signals. These signals may be either freely accessible or only accessed via a subscription system, and may be broadcast in a number of different ways, including terrestrial radio signals, satellite radio signals, and cable.

The entertainment system may simply provide a received television programme for output to a display such as a television, either via a wireless or wired link or as an integral part of the display itself, but it may also provide means to record a received television programme, most commonly for digital television broadcasts on to a hard disk.

In addition, most broadcasters of programmes also broadcast electronic programme guide data, (EPG data), which provides schedules for broadcast programmes describing at what time and on what channel each programme will be shown. The entertainment system can use this EPG data to generate an electronic program guide or EPG for display to the user.

Since the EPG data typically comprises information for several hundred channels and for several days' viewing, the displayed EPG itself tends to only show a relevant subsection of this information, with the user then navigating through the EPG data for example by moving the displayed EPG subsection along time and channel axes. Thus 'EPG data' represents the electronic programme guide data received from the broadcaster, whilst 'EPG' represents the generated electronic programme guide interface presented to the user, which typically represents at any one time only a small portion of the EPG data, firstly in terms of the channels and times displayed in the EPG but also potentially also in terms of the data available in the EPG data in relation to a particular programme.

If the user selects an entry in the displayed EPG, the entertainment device can typically use the corresponding information in the EPG data to either switch to the programme, or schedule a recording of the programme, as applicable.

Figure 1:
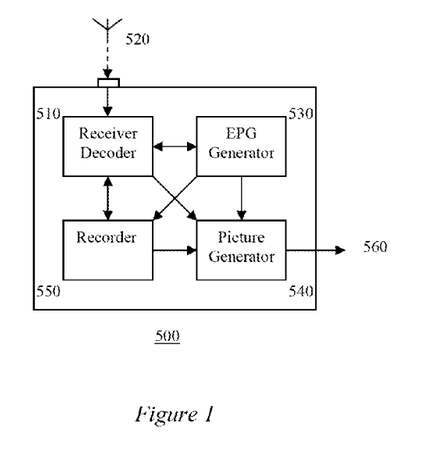
FIG. 1 is a schematic diagram of an entertainment system for receiving television programmes that is known in the art.

Thus referring to FIG. 1, a typical entertainment system for television programmes comprises a receiver/decoder 510 for receiving broadcast programmes and EPG data from an input 520 which is shown as an aerial, but could instead be a satellite dish or cable connection. EPG data is decoded from the received signal and sent to an EPG generator 530 (typically part of a more general user interface generator, not shown), whilst decoded programme data is sent to a picture generator 540 and may also be sent to a recorder 550.

In use, EPG display information may be sent from the EPG generator to the picture generator to display the EPG as some or all of the displayed image, which is then sent via output 560 to a display (not shown). Selected EPG data may also be sent to the receiver/decoder to control which selected programme is received and decoded, and similarly may be sent to the recorder to control which selected programme is to be recorded. In this case, when the recording becomes due, the recorder may similarly send the selected EPG data to the receiver/decoder to control which selected programme is received and decoded.

However, whilst such entertainment systems can provide a social activity, for example in public venues or to the extent that a family may view a programme together, the scope for broader social interaction via television programmes is currently limited.

The present invention is intended to mitigate the above limitation.

SUMMARY OF THE INVENTION

In a first aspect, there is provided an entertainment system according to claim 1.

In another aspect, there is provided an entertainment system according to claim 8.

Further respective aspects and features of the invention are defined in the remaining appended claims.

The above aspects advantageously allow the user of an entertainment system such as a set-top box to recommend programmes to their friends via the EPG interface, and allows the entertainment systems of those friends to interpret the recommendations with respect to their own EPG data and so act upon the recommendation without the need for the friends to manually search for or enter programme schedule information.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

An entertainment system and method of communication are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 2:
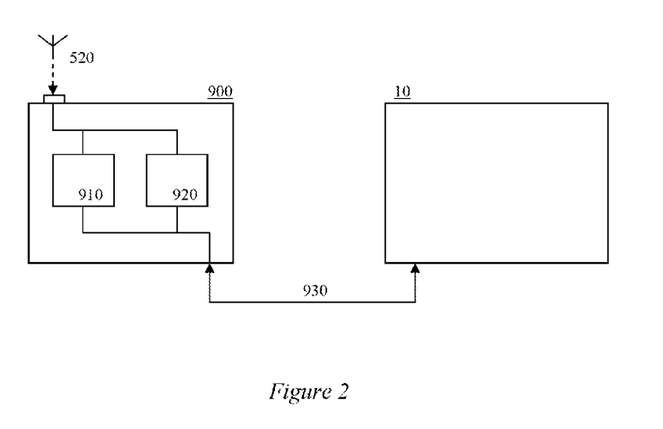
FIG. 2 is a schematic diagram of an entertainment system in accordance with an embodiment of the present invention.

Referring now to FIG. 2, in an embodiment of the present invention a suitable entertainment system comprises the system unit of a Sony® Playstation 3® (PS3®) entertainment device operably coupled to a Play TV dual digital TV receiver 900 (hereafter a 'Play TV receiver').

Figure 3:
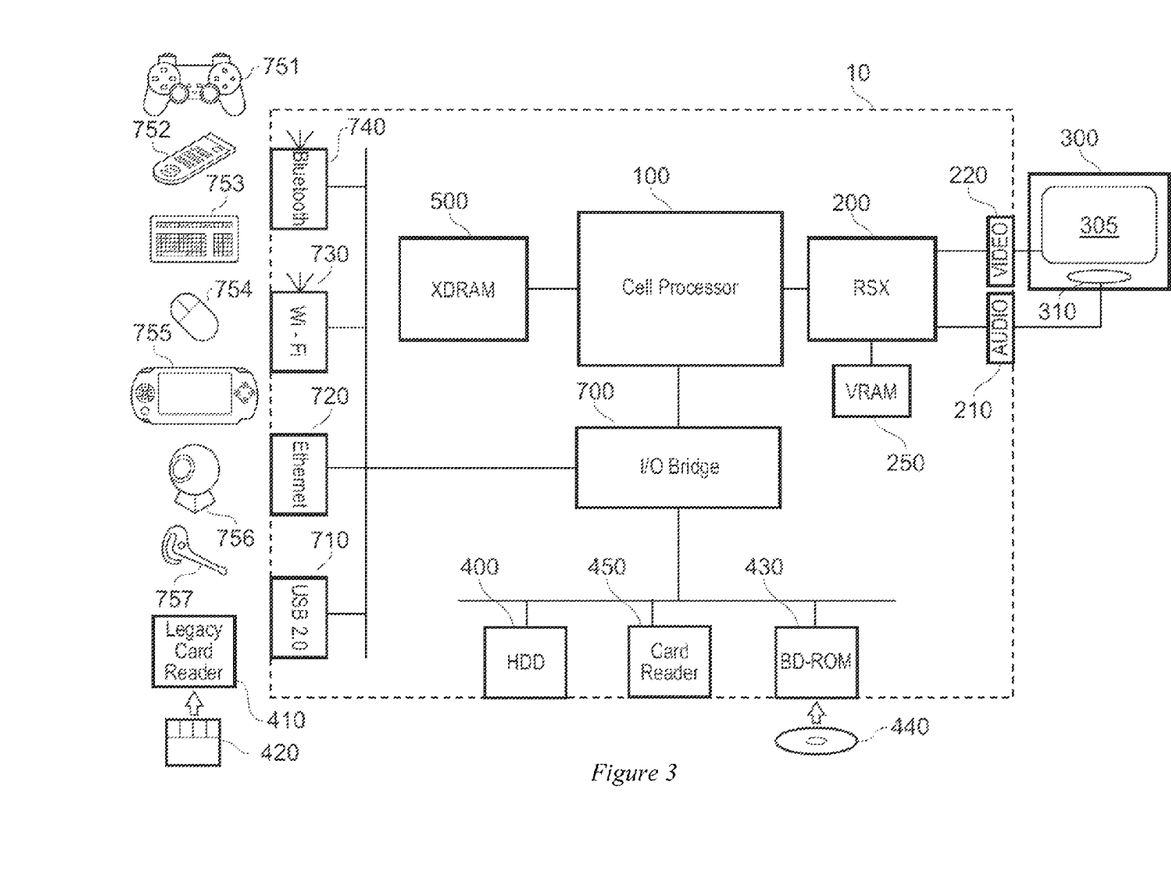
FIG. 3 is a schematic diagram of an entertainment device in accordance with an embodiment of the present invention.

Referring now also to FIG. 3, the PS3 entertainment device comprises a system unit 10 to which various peripheral devices can be connected, including the Play TV receiver 900.

The PS3 system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections, any of which can provide network communications.

In operation the I/O bridge 700 handles all wireless, USB and Ethernet data, including data from one or more optional game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other optional peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link. Such input devices, in conjunction with software to interpret their signals, are operable as user inputs to the PS3.

The provision of these interfaces means that the Playstation 3 device is also potentially compatible with other peripheral devices such as digital video recorders (DVRs) and set-top boxes, as noted previously, as well as digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

The PS3 system unit is also capable of connecting to the internet via the WiFi or Ethernet ports.

The Blu Ray Disk BD-ROM reader 430 is operable to read CD-ROMs compatible with the Playstation and PlayStation 2 devices, in addition to conventional pre-recorded and to recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition. Consequently the Reality Synthesiser graphics unit 200 is operable as a display generator and, under the control of the Cell processor 100, as a user interface generator.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

The video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10.

In general, in order for successful data communication to occur with a peripheral device such as a video camera, set-top box or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Referring again to FIG. 2, the Play TV receiver 900 comprises a first receiver 910 and a second receiver 920 each operably coupled to the aerial, cable or satellite input 520. Each receiver can independently tune in to digital TV and radio channels available via the to input, and outputs a respective audio-video data stream, together with any received metadata. It will be appreciated that whilst two receivers are preferable to enable the recording of one programme whilst watching another, this is not necessary and another number of receivers (for example one) is also envisaged.

When used in combination with the PS3, a USB link 930 between the Play TV receiver and a USB port 710 of the PS3 provides control of the Play TV receiver, and routes its output to the PS3.

The cell processor 100 then routes selected audio-video (AV) data to the Reality Simulator graphics unit 200 for output to a display.

In addition, the Cell processor also processes any non-AV metadata data, such as electronic programme guide data, teletext, or parental control data, and generates user interface data such as teletext data, an EPG guide, or a parental warning and/or password screen for the Reality Simulator graphics unit 200 to incorporate into its output as required. The non-AV data itself may be stored in RAM or on the internal hard disk 400 as required.

In an embodiment of the present invention, the PS3 10 also uses its internal hard disk 400 to record programmes received via the receiver(s) of the Play TV receiver.

Thus the combined system of the Play TV receiver 900 and the PS3 can, in a first instance, typically operate in a similar manner to the entertainment system of FIG. 1, with the Play TV receiver operating as the receiver 510 (optionally with decoding by the cell processor), the cell processor 100 operating as the EPG generator 530, the Reality Simulator graphics unit 200 operating as the picture generator 540, and the hard disk operating as the recorder 550. The functionality of these elements is typically supervised by the cell processor operating under instructions from software in the operating system. In other words, the combined entertainment system is operable to receive broadcast programmes and electronic programme guide data, comprises a display generator operable to generate an image for display, and an EPG (or, more generally, a user interface) generator that can generate an EPG indicating one or more programmes on a broadcast schedule.

In an embodiment of the present invention, a user of this entertainment system may cause an electronic programme guide (EPG) to be displayed in a conventional manner by pressing a button on the remote control 752 or a game controller 751, signals from which are received by a user input of the PS3 (for example the blue tooth receiver 740, I/O bridge 700 and cell processor 100). The EPG by default displays programme information including the current programme on the current channel, together with programmes currently on to neighbouring channels. In addition the EPG typically will display programme information for one or more subsequent scheduled programmes on the current and neighbouring channels. The user may then navigate through further EPG data via the EPG to obtain information about further current or scheduled programmes as desired, to the extent that this information is available from the broadcast EPG data. For example, most EPG data is limited to up to 7 days in advance.

Thus as noted previously, the user interface provided by the EPG presents a subset of programme information for some currently broadcast programmes and some programmes scheduled for future broadcast based upon the full EPG data received from the broadcaster.

The user may then select an entry from the EPG in a conventional manner (for example by navigating around the EPG using the remote control or game controller, and pressing a selection button). This then brings up a menu of options.

In an embodiment of the present invention however, alternatively or in addition to conventional menu options such as 'view programme', 'set reminder' or 'record programme', a new option that the user can choose is 'recommend programme', as described below.

In an embodiment of the present invention, the option to recommend a programme allows a user to send a recommendation message to one or more friends included on a so-called 'friends list'. The friends list is part of the PS3's networking facility; on start-up, the PS3 automatically logs on to the PlayStation Network (PSN) and posts its own status to a PSN server. In addition it obtains the status of those PS3s that belong to the user's friends as listed on the user's friends list.

In this way, the user can easily determine the status of their friends (such as whether they are currently online), and then further communicate or interact with them, for example via a text-based messaging facility or a two-way video link, or an invite to join a game.

It will be appreciated, however, that any mechanism for identifying a group of friends (for example an instant messaging address book, or peer-to-peer connection list) may be similarly used as a friends list for the purpose of sending recommendation messages.

Notably, the PS3 may communicate with the remote PS3 of one or more friends on the friends list either via a PSN server or directly peer-to-peer. Either mechanism may be suitable for the purposes of sending recommendation messages.

Hence in an embodiment of the present invention, when a user selects 'recommend programme' from the EPG selection menu, they are given the option to recommend the selected programme to one or more of their friends on their friends list.

For the purposes of clarity in the following description, in a non-limiting example the user selects one friend from their list to whom they want to send a recommendation.

In response to this selection, the PS3 then obtains information from its EPG data that identifies the selected programme.

In an embodiment of the present invention, this information is a unique identification number (unique ID) associated with the respective EPG data entry for the selected programme. It will be appreciated that the identification number may only be unique to the extent that it is used once in the current issue of the EPG data from the broadcaster. The unique ID is typically broadcast with the EPG data, but in principle may be obtained from a broadcaster's server over the internet, either directly or via a PSN server cache.

The PS3 then uses the PSN messaging facility (or, as noted above any suitable messaging system, either via a server or peer-to-peer) to transmit a recommendation message containing the unique ID for the selected programme to the friend's PS3. The recommendation message may take the form of a message for the friend to read or simply a system message for the PS3. In either case the unique identification number is formatted so that the friend's PS3 can detect it as such; for example, it may be included as metadata with the message, or as part of the main message text with a suitable identifier tag appended or prepended to it.

In response to receiving such a message and detecting the information relating to the TV programme, the friend's PS3 then accesses to its own EPG data (as received from a broadcaster via its own Play TV receiver), using the unique ID to identify the corresponding programme entry.

The friend's PS3 can then use its own EPG data (e.g. as received from a broadcaster) to do one or more of the following:

Firstly, display to the friend a message recommending the programme, and optionally (where a suitable messaging protocol was used), displaying the identity of the person who sent the recommendation message, and optionally displaying any text that they sent as well.

Secondly, automatically set a reminder to watch the recommended programme based on the identified local EPG data. The reminder message will typically be displayed at a predetermined time prior to the scheduled broadcast time of the programme (for example, 10 minutes beforehand, assuming that the PS3 is switched on at that time). Again, optionally the originator of the recommendation message can be identified and any text they sent may be included in the reminder message when it is displayed.

Thirdly, automatically set the PS3 to record the recommended programme based on the identified local EPG data. Again optionally the identity of originator of the recommendation message and any text they sent may be associated with the recording.

In this case, optionally the user can pre-select a set of trusted originators from whom recommendations cause automatic recording; other recommendations may prompt a confirmation message or be rejected.

Fourthly, switch to the recommended programme using the identified local EPG data if it is currently being broadcast or optionally if it is due to start within a threshold period of time (for example the next 10 minutes). Again optionally the identity of originator of the recommendation message and any text they sent may be displayed.

In each case, the friend may be given the opportunity to accept or decline the recommendation or accept or decline the proposed action as applicable.

In the first case, accepting the recommendation can trigger one of the second, third or fourth actions, or trigger a menu to select one of these as applicable.

In the above embodiment, however, the use of a unique ID as the only source of identifying information in the message is susceptible to the problem that broadcasters can broadcast different EPGs in different geographical areas, for example to accommodate regional variations in programming such as local news programmes and the like. As a result it is possible that the unique ID corresponding to the EPG entry on the originating user's EPG will not correspond as desired with a similar EPG entry on the friend's EPG, if the friends are geographically distant.

Hence alternatively or in addition to a unique ID, in an embodiment of the present invention the PS3 obtains identifying data that comprises the name of the selected programme, or the channel name (or other identifier) and timing of the selected programme, or both. The timing information may comprise the start time and/or the end time of the programme.

If this information is received in a recommendation message by a friend's PS3, that PS3 can either:

Firstly, if only the programme name is provided, search the EPG for a matching instance of the programme, or optionally the next available instance of the programme if there is more than one match.

Alternatively, if a channel identifier and timing information is provided, then find the programme that most closely corresponds to that start (and/or end) time and that channel.

In each case tolerances for acceptable deviations in timing and name can be predetermined.

For example, if the recommendation message included the channel identifier 'MyChannelHD', but the local EPG only lists 'MyChannel', this is an acceptable variation as the 'HD' qualifier is well understood to represent a high definition equivalent of a standard definition channel. The skilled person will appreciate that other variations in channel name may be accepted, such as regional tags. So, for example, 'BBC® South' may map to 'BBC®' if a BBC South channel cannot be found on the local EPG. A list of acceptable variations may be compared against in the case that an exact channel match cannot be found. Such a list may be stored on the PS3 as part of the software, and/or updated or accessed from a server such as a server on the PSN network Notably, where a substitute channel includes the channel name variant '+1', or lacks it if this was part of the named channel in the message, then the scheduled programming can be assumed to vary by one hour (either back or forward as applicable) and so the received timing information may be shifted back or forward by one hour as well. In this case the friend and/or originating user may be notified of the timing shift, so that they are aware that they may not get to watch the programme simultaneously.

Where the channel identifier is a channel number, again a tolerance to variations in channel number may be applied (for example ±3 channels). Typically channel number change between broadcasters, and so optionally the broadcaster used by the originating PS3 (for example Sky® or Virgin®) may be identified in the recommendation message. Where the broadcaster differs on a friend's PS3, optionally a lookup table mapping channels between broadcasters may be accessed from a PSN server.

Similarly, variations in scheduled start (and/or end) times may be tolerated to within a threshold amount. A non-limiting example is ±10 minutes from the time or times in the recommendation message.

If no matching or suitable substitute channel can be found, or the local broadcast time(s) exceed a threshold deviance from the time(s) in the recommendation message, optionally an error message may be displayed to the friend, and/or a failure message posted back to the originating user.

Finally, if both the programme name, and the channel name and start (or end) time are provided, then as above the matching or substitute channel can be found and the instance of to the named programme closest to the specified time(s) is identified. In this case the threshold on time variance may be made more generous as there is a greater confidence that the named programme as found is correct.

If no matching or suitable substitute channel can be found, or the local broadcast time(s) exceed the threshold deviance from the time(s) in the recommendation message, or the named programme does not clearly appear on that channel, optionally an error message may be displayed to the friend, and/or a failure message posted back to the originating user. Alternatively or in addition, the PS3 can do a full search of the EPG data for the closest match to the programme name (and where multiple results are found, rank these by how closely timings and channel names match), and present one or more of these to the friend, optionally displaying the caveat that it may not exactly match the programme recommended by the originating user.

Once an instance of the programme is identified according to one of the above techniques, the PS3 can then proceed in a similar manner to that described previously for the case of a unique ID, and recommend, remind, record or switch to the programme as applicable.

In an embodiment of the present invention, alternatively or in addition to transmitting a recommendation message to one or more friends' PS3s, the user's PS3 is operable to format the recommendation message as a posting message to an account of the user on one or more social networks, such as Facebook®, Myspace® or Twitter®. Any specific formatting information for supported social networking sites can included with the software controlling the entertainment system, and updated via the PSN as required.

In an embodiment of the present invention, EPG data relating to a respective programme entry (for example the unique ID described previously, or similarly the programme name) can be used to generate a Uniform Resource Locator (URL). Where the social network supports hyperlinks or remotely linked graphics, optionally the posting may then include a URL link constructed from the EPG information, for example in the following format:

<IMG SRC="http://broadcaster-site/epg-images/programme-unique-id.jpg">

This enables the broadcaster to include an advert, screen capture, synopsis, or further schedule details for a programme as a graphical image or web link within the recommendation posting on the social networking site. It will be appreciated that other link types may also be generated in this way, such as links to video trailers.

The root of the URL (in the above case, 'broadcaster-site/epg-images/') may be included in an auxiliary data field of the EPG data itself, or in the software controlling the entertainment system, or obtained from a server on the PSN. The type of link (for example .jpg or .swf) associated with a programme entry may be fixed, or listed explicitly within an auxiliary data field of the entry, or denoted by a flag or by some quality of the unique ID number (for example, an even number for a .jpg still image and an odd number for a .swf video).

In addition, the accessing of the item from the broadcaster's website may allow the broadcaster to track which programmes are receiving a large number of recommendations, or optionally which users are making lots of recommendations.

Whilst the above techniques have been described primarily with respect to programmes scheduled to be broadcast, it will be appreciated that many of the same techniques may be applied for a programme that is currently being broadcast and is being viewed by the user.

Thus, in an embodiment of the present invention, the user may initiate an option on the user interface to alert one or more friends to the currently viewed programme. The mechanism by which the alert message is sent to the or each friends and identified by the or each friend's PS3 is essentially the same as described previously for other recommendation messages, but a flag or similar indicator that the programme is currently being viewed can restrict both the scope of the search of the or each friend's PS3's EPG data to current programmes, and restrict the options available to simply accepting the recommendation to view the programme and/or switching to it. Alternatively the friend's PS3 can detect that the programme is currently on air from the received timing information.

However, in addition to recommending the programme, a user may also select to initiate a network chat session for the programme.

One embodiment of a network chat session involves sending messages to all active members of a chat session over a network (e.g. the internet), and logging them to form a so-called 'thread' of messages that is updated in real time as new messages arrive or are sent. The number of members at any time may range from one to the maximum number supported by the software, for example 64. When new members join the chat session, they may receive all or part of a history of the thread in order to familiarise themselves with it.

The text of the chat session messages may be overlaid on the displayed programme, for example down one side, or across a bottom section of the display. Various alternative layouts will the apparent to the skilled person.

Alternatively or in addition, a network chat session can utilise a video camera 756 on each PS3 to provide an audio-video link between members, typically presented as a picture-in-picture window positioned over part of the currently displayed programme. Typically bandwidth constraints and available screen area will limit the number of participants to two, though in principle more are possible.

It will be appreciated that a mix of these modalities may exist in a network chat session where, for example, not all the members have a video camera connected to their PS3.

In any case, when a user elects to initiate a network chat session for a currently broadcast programme, the user interface allows the user to nominate one or more friends from their friends list and sends a recommendation message to these friends' PS3s that includes the network chat session invite.

The recipient PS3s respond to the recommendation message as described previously herein and further ask for a user input as to whether they wish to join the chat session.

Typically the originating user's PS3 will then host and co-ordinate the network chat session between the participating PS3s in a conventional fashion.

Optionally the chat session itself can be associated with the programme and/or channel, and so multiple chat sessions for multiple channels amongst overlapping and partially overlapping networks of friends are possible.

It will be appreciated that the above process may also be used to co-ordinate a network chat session for a programme this is about to start, for example within a threshold period of 10 minutes.

Where the user wishes to frequently recommend and optionally chat about the currently viewed programmes with certain friends, the user may select a subset of their friends list for this purpose. The process of alerting the currently viewed programme to all these friends may then be simplified to a 'sync my mates' button or menu option that initiates recommendation messages to this subset of friends. Operation of such a button or menu option causes a recommendation or alert message to be sent to all the friends in the selected subset.

To facilitate the selection of friends for recommendation/alerts and optionally network chat sessions, in an embodiment of the present invention a PS3 that is coupled to a Play TV to receiver will indicate this fact to the PSN network (for example at start-up), so that the status of other PS3 friends lists can be updated. Thus each user's friends list can include an indication of which of their friends have Play TV receivers.

It will be appreciated that for currently viewed programmes, the posting of a recommendation message to the user's social networking account(s) identifying the currently viewed television programme could be automated, thereby creating a viewing blog. In this case, optionally certain channels may be included or excluded from being reported in this way during a configuration process.

Figure 4A:
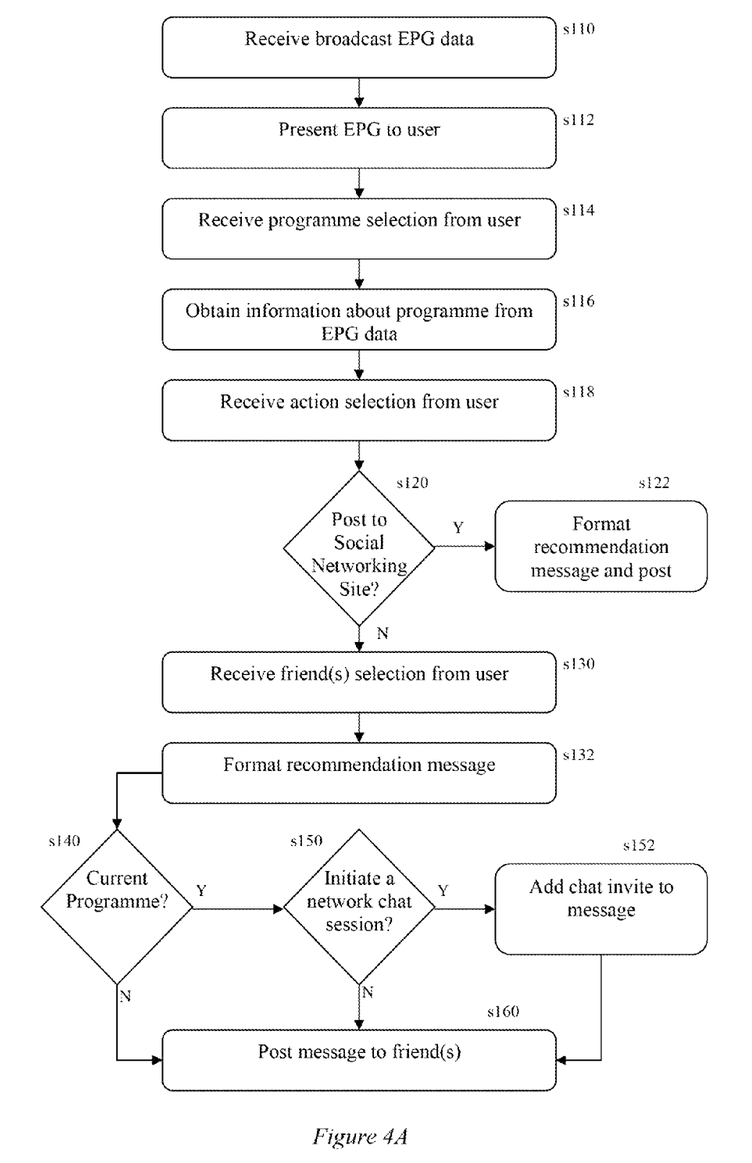
FIG. 4A is a flow diagram of a method of programme scheduling in accordance with an embodiment of the present invention.

FIG. 4A provides a summary of operation for a method of communication as described herein for the PS3 of the originating user.

In an embodiment of the present invention, at step s110, the entertainment system receives EPG data from a broadcaster, via the Play TV dual digital TV receiver 900. The Cell processor 100 then prepares a subset of the EPG data for presentation to the user as an electronic programme guide at step s112. The user selects a programme from the EPG through the user interface, and at step s114, this programme selection is received by the entertainment system.

At step s116, the information to be sent with a recommendation message (or alert or posting message) is obtained from the EPG data (e.g. a unique ID, and/or channel name, programme timing and/or programme name). The user selects what they want to do with the selected programme item, and at step s118, this action selection is received by the entertainment system.

At step s120, if the selected action is to post the recommendation to a social networking site, then the obtained information and the message comprising it are formatted at step s122 in a manner suitable for the social networking site and are posted. Any various intervening steps (such as an automated login process in order to post) are not shown.

Otherwise, the user nominates one or more friends to receive the recommendation or alert message, and at step s130, this selection of friends is received by the entertainment system (for example through a succession of separate selection actions, one for each friend).

At step s132 the recommendation message is formatted. At step s140 it is detected whether the selected programme is currently being broadcast, and if so at step s150 the user is asked whether they want to initiate a network chat session. If they do want a network chat session then the recommendation message is modified at step 152 to include a network chat invitation. At step 160, the modified or unmodified recommendation message is then posted to the or each friend.

It will be noted that the above method differs in the order of operation from the previous description, highlighting that various different embodiments are possible. Further variants on the above method include combining steps s114 and s118 so that programme selection and desired action are a single step, for example by providing dedicated buttons for different actions (such as for example 'recommend' and 'blog' buttons in addition to a 'record' button). Similarly step s116 could follow a positive outcome to one of steps s118 or 150, or a negative outcome for step 140. Other variations could include using a preset friends group for chat session, for example. Further variations will be apparent to the person skilled in the art.

Figure 4B:
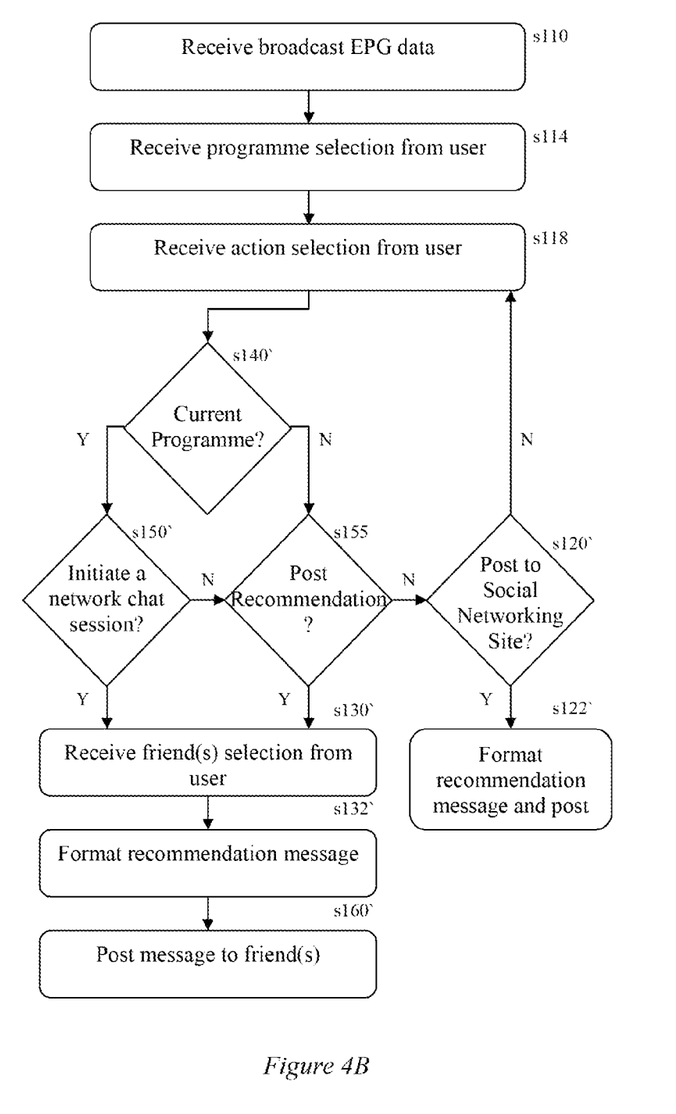
FIG. 4B is a flow diagram of a method of programme scheduling in accordance with an embodiment of the present invention.

FIG. 4B provides a summary of such a variant embodiment, using similar principles to those recited above in respect of FIG. 4A. Steps s110 to s118 are the same as in FIG. 4A (in FIG. 4B, steps s112 and s116 have been omitted for simplicity). The remaining steps proceed in a different order to those in FIG. 4A. First, in step s140' the PS3 detects whether the selected programme is currently being broadcast, and if so at step s150' the user is asked whether they want to initiate a network chat session. If the outcome of either step s140' or s150' is negative, at a new step s155 the user is explicitly asked if they want to post a recommendation message (for example, thereby confirming the action selection of step s118). If the outcome of either step s150' or s155 is positive, then at step s130' the user nominates one or more friends to receive the recommendation or alert message and at step s132 the recommendation message is formatted (this step can incorporate step s152'—not shown—to add a chat invite as applicable). Then at step s160' the modified or unmodified recommendation message is then posted to the or each friend. Meanwhile, if the outcome of step s155 is negative, at modified step s120' the user is asked if they want to post to a social networking site (again, for example, either confirming the action selection of step s118 or providing more detailed options at this point). If the outcome of step s120' is positive then the obtained information and the message comprising it are formatted at step s122' in a manner suitable for the social networking site and are posted. Again any various intervening steps (such as an automated login process in order to post) are not shown.

Hence, as noted previously, a number of configurations for the process of sending recommendations, chat invites and/or social networking posts are possible.

Figure 5A:
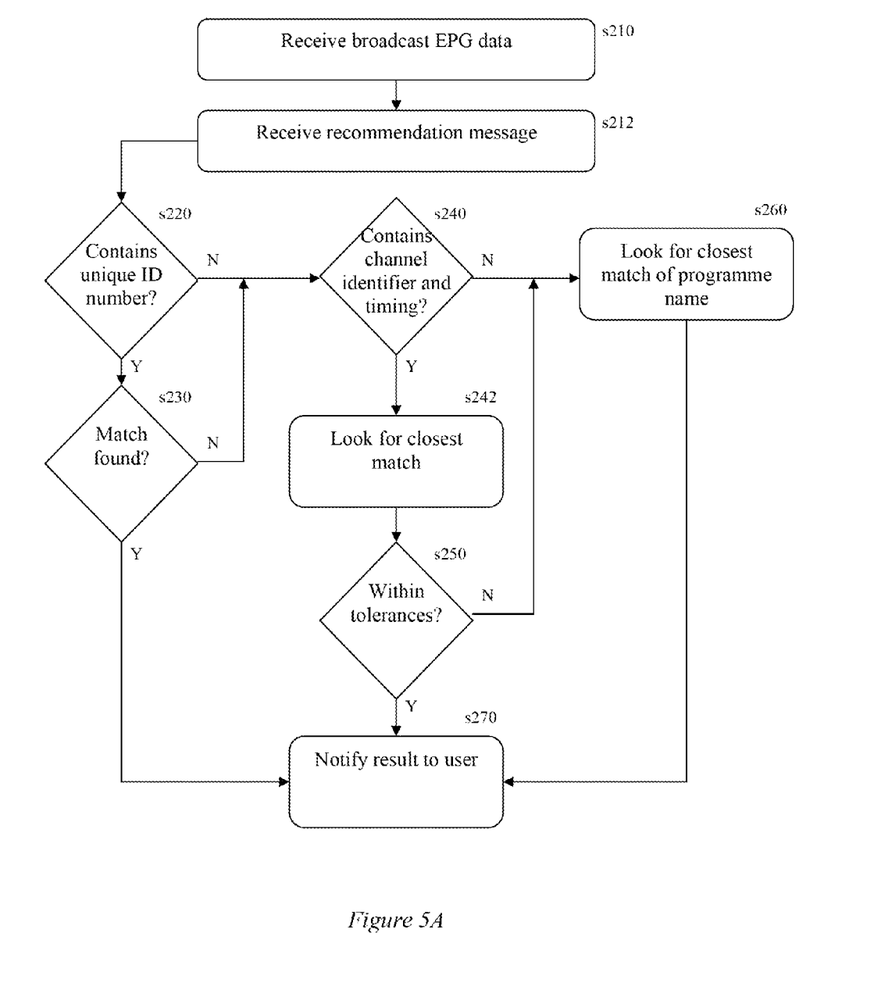
FIG. 5A is a flow diagram of a method of programme scheduling in accordance with an embodiment of the present invention.

FIG. 5A provides a summary of operation for a method of communication as described herein for the PS3 of a recipient friend.

At step s210, the entertainment system receives EPG data from a broadcaster, via the Play TV dual digital TV receiver 900. Separately, at step s212, the PS3 receives a recommendation (or alert) message via the PSN or some other network link.

At step s220, the PS3 detects whether the recommendation/alert message contains a unique ID, and if so at step s230 whether a match is found in the PS3's own EPG data. If so, the result is notified to the user at step s270. However, if there is no unique ID or no match for it, then at step s240 the entertainment system detect whether a channel identifier and timing details are present. If these are found in the recommendation message, the closest match in the PS3's own EPG data is searched for at step s242. If at step s250 this match is found to be within predetermined tolerances for deviations in channel name and programme timing, then the corresponding programme is reported to the user at step s270. However, if the channel and timing details are not present in the recommendation message or the ensuing match falls outside predetermined tolerances, then the programme name is extracted from the recommendation message, and the closest match of programme name within the PS3's EPG data is found at step s260 and alerted to the user at step s270.

Subsequently the entertainment system may then use the identified EPG data to record, remind, or switch to the recommended programme as appropriate, as described previously.

Again it will be appreciated that this method is but one of several possible embodiments. For example, where both channel name, timing and programme name information are present, all can be searched for simultaneously as described previously. Likewise where a unique channel ID is included as well, this can also be searched for at the same time, with the channel name and/or programme name being used as a cross-check of the programme identified in the user's EPG as corresponding to the unique ID. Optionally the threshold on acceptable time variations can be waived if there is a unique ID match, and likewise the allowed deviation in names can be made more lenient.

Hence, it will be apparent to a person skilled in the art that variations in the above methods corresponding to operation of the various embodiments of the apparatus as described and claimed herein are considered within the scope of the present invention.

Figure 5B:
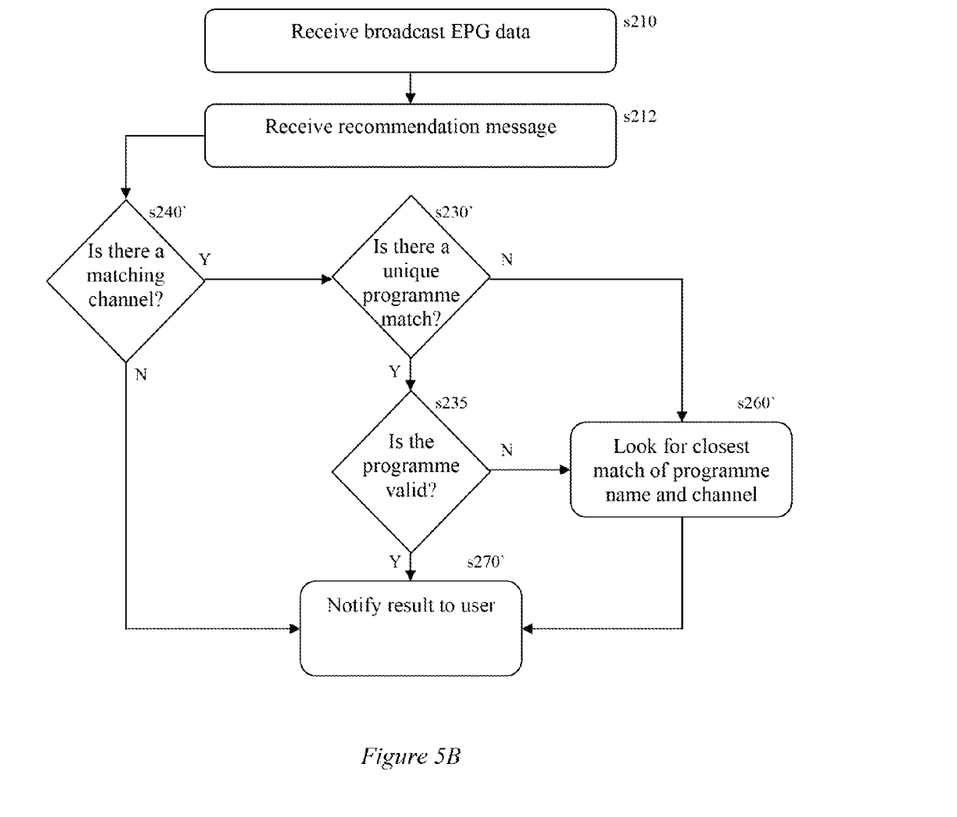
FIG. 5B is a flow diagram of a method of programme scheduling in accordance with an embodiment of the present invention.

For example, FIG. 5B provides a summary of such a variant embodiment, using similar principles to those recited above in respect of FIG. 5A. Steps s210 and s212 are the same as in FIG. 5A. The remaining steps proceed differently to those in FIG. 5A. Firstly, to in step 240' (incorporating step 242 of FIG. 5A), assuming that channel data is included in the recommendation message, the PS3 detects whether a matching channel can be found in the PS3's own EPG data. Optionally step 250 of FIG. 5A may also be applied to allow for minor variations. Where substantially matching channel is found, then assuming that either the programme name or the unique ID are included in the recommendation message, at step s230' the PS3 detects whether a match is found in the PS3's own EPG data. If the outcome is positive, then at new step s235 the PS3 determines whether the programme is valid; for example whether the recommendation has been received too late to properly view the programme (or a preset minimum remaining proportion of it) or whether the programme restricted for some reason, such as being on a channel to which the user is not subscribed, or due to parental controls and the like. If the outcome of steps s230' or s235 are negative, then at step s260' (also incorporating step 242 of FIG. 5A) the PS3 searches for alternative instances of programmes and channels that may constitute a match. If no matching channel is found at step s240', or no sufficiently matching programme and channel combination is found at step s260', the user is notified accordingly at step s270'. Conversely if a valid programme match is found at step s235 then the recommendation is notified to the user at step s270'.

In addition, it will be appreciated that an entertainment system may operate both as an originating system (sending messages) and as a friend's system (receiving messages) according to the techniques as described herein.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device.

We claim:

1. An entertainment system, comprising
a broadcast radio receiver, operable to receive terrestrial, satellite, or cable broadcast programmes associated with first electronic programme guide data;
a display generator, operable to generate an image for display;
a user interface generator, operable to use the first received electronic programme guide data to generate an electronic programme guide that indicates one or more programmes on a broadcast schedule, for display as some or all of the image;
a user input operable to receive an input indicating a programme that has been selected by a user from the electronic programme guide; and
a network communicator operable to communicate with one or more remote entertainment systems over a network; and in which
the entertainment system is arranged in operation to obtain information based upon the first electronic programme guide data corresponding to the user's selected programme, said obtained information comprising one or more selected from the list consisting of:
  i. a name of the user's selected programme; and
  ii. an identification of the channel on which the user's selected programme is broadcast and an indication of when it is broadcast; and
the network communicator is arranged in operation to transmit a message comprising the obtained information to one or more remote entertainment systems arranged in operation to interpret the message with reference to a second, different electronic programme guide comprising different electronic programme guide data than the first electronic programme guide data, thereby indicating to each remote entertainment system the user's selected programme;
upon receiving over the network from a remote entertainment system a message comprising information relating to a programme based upon the second electronic programme guide data used by the remote entertainment system, the entertainment system is arranged in operation to identify a corresponding entry for the programme in the first electronic programme guide data; and
when no corresponding entry is identified, preparing a failure indication for display or posting back to the remote entertainment system.

2. An entertainment system according to claim 1, in which
the first electronic programme guide data comprising entries, wherein each entry corresponds to a programme, wherein each entry is associated with a unique identifier; and
the obtained information transmitted to each remote entertainment system comprises the unique identifier corresponding to the user's selected programme.

3. An entertainment system according to claim 1, in which the first electronic programme guide data comprises data for respective programmes specifying the programme's name, an identification of the channel on which it is broadcast and an indication of when it is broadcast.

4. An entertainment system according to claim 1, in which the entertainment system is further arranged in operation to obtain information based upon the first electronic programme guide data corresponding to a broadcast programme currently selected for viewing by the user; and
the network communicator is arranged in operation to transmit an alert message comprising the obtained information to one or more remote entertainment systems, thereby indicating to each remote entertainment system the currently viewed broadcast programme.

5. An entertainment system according to claim 4, in which the user input is operable to receive an input indicating that the user wishes to initiate a network chat session in respect of the currently viewed broadcast programme; and the alert message further comprises a network chat session invitation.

6. An entertainment system according to claim 1, in which the network communicator is arranged in operation to format the obtained information in a manner suitable for posting to one or more predetermined social networks, and to transmit a posting message comprising the formatted obtained information to an account of the user on each predetermined social network.

7. The entertainment system of claim 1, wherein the system is further configured to set a tolerance value for acceptable deviations in one or both of broadcast timing and programme name when identifying the corresponding entry.

8. The entertainment system of claim 7, wherein when the name of the user's selected programme, the channel identification and the broadcast indication are provided, the system is configured to increase the tolerance value for broadcast timing.

9. A method of programme scheduling for an entertainment system, comprising the steps of:
receiving terrestrial, satellite, or cable broadcast first electronic programme guide data; generating for display an electronic programme guide that indicates one or more programmes on a broadcast schedule;
receiving an input indicating a programme that has been selected by a user from the electronic programme guide;
obtaining information based upon the first electronic programme guide data corresponding to the user's selected programme, said obtained information comprising one or more selected from the list consisting of:
  i. a name of the user's selected programme; and
  ii. an identification of the channel on which the user's selected programme is broadcast and an indication of when it is broadcast;
communicating a message comprising the obtained information over a network to one or more remote entertainment systems arranged in operation to interpret the message with reference to a second, different electronic programme guide comprising different electronic programme guide data than the first electronic programme guide data, thereby indicating to each remote entertainment system the user's selected programme;
receiving over the network from a remote entertainment system a message comprising information relating to a programme based upon the second electronic programme guide data used by the remote entertainment system;
identifying a corresponding entry for the programme in the first electronic programme guide data using the received message; and when no corresponding entry is identified, preparing a failure indication for display or posting back to the remote entertainment system.

10. The method of claim 9, further comprising setting a tolerance value for acceptable deviations in one or both of broadcast timing and programme name when identifying the corresponding entry.

11. The method of claim 10, further comprising increasing the tolerance value for broadcast timing when the name of the user's selected programme, the channel identification and the broadcast indication are provided.

12. A tangible non-transitory computer program product on which computer readable instructions of a computer program are stored, the instructions, when executed by a processor, cause the processor to perform a method of programme scheduling for an entertainment system, the method comprising:

receiving terrestrial, satellite, or cable broadcast first electronic programme guide data; generating for display an electronic programme guide that indicates one or more programmes on a broadcast schedule;

receiving an input indicating a programme that has been selected by a user from the electronic programme guide;

obtaining information based upon the first electronic programme guide data corresponding to the user's selected programme, said obtained information comprising one or more selected from the list consisting of:

i. a name of the user's selected programme; and ii. an identification of the channel on which the user's selected programme is broadcast and an indication of when it is broadcast;

communicating a message comprising the obtained information over a network to one or more remote entertainment systems arranged in operation to interpret the message with reference to a second, different electronic programme guide comprising different electronic programme guide data than the first electronic programme guide data, thereby indicating to each remote entertainment system the user's selected programme;

receiving over the network from a remote entertainment system a message comprising information relating to a programme based upon the second electronic programme guide data used by the remote entertainment system;

identifying a corresponding entry for the programme in the first electronic programme guide data using the received message; and when no corresponding entry is identified, preparing a failure indication for display or posting back to the remote entertainment system.

\* \* \* \* \*